Patented Mar. 3, 1931

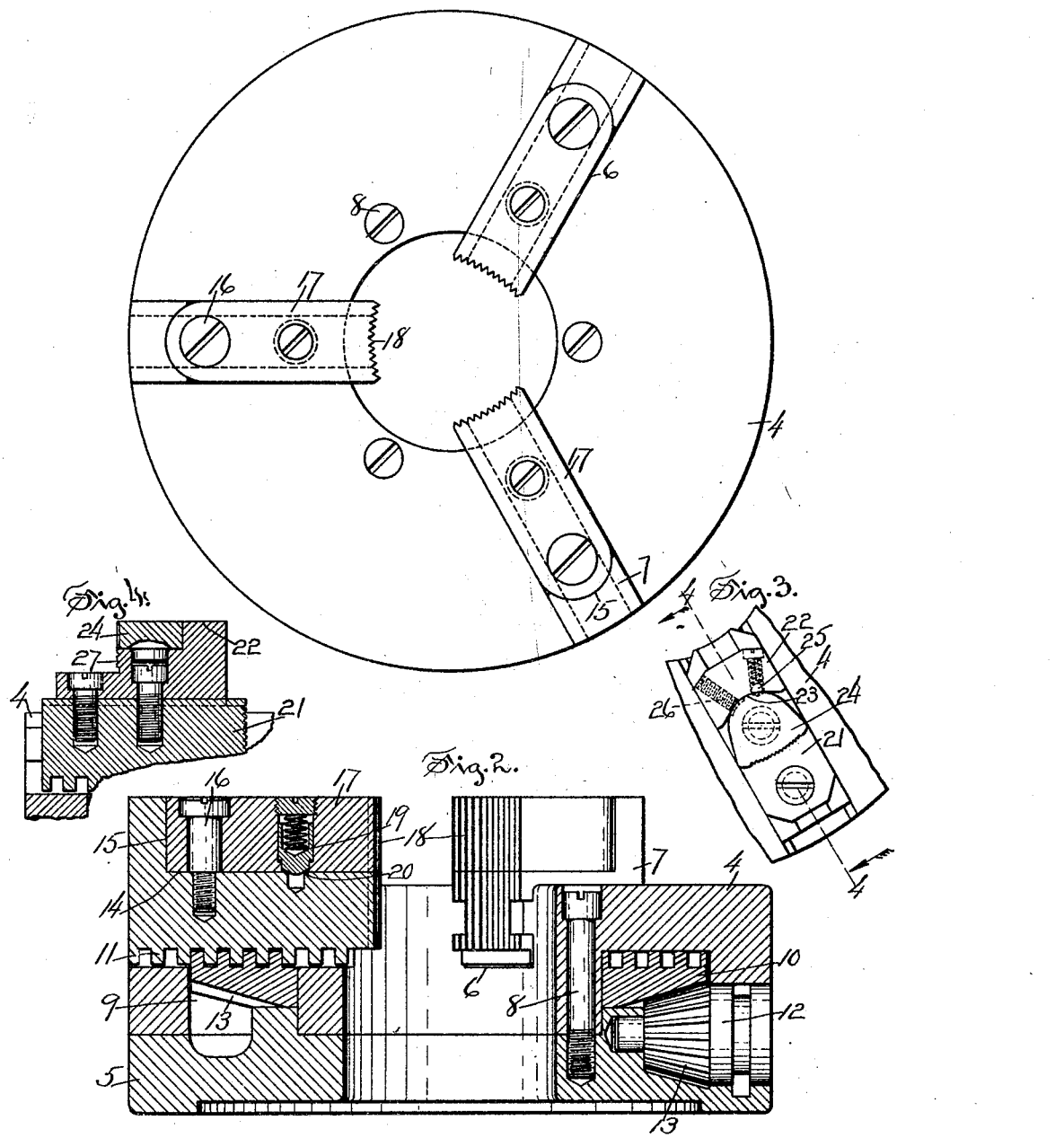

1,794,511

UNITED STATES PATENT OFFICE

GEORGE G. BUSH, OF NEWINGTON, CONNECTICUT, ASSIGNOR TO UNION MANUFACTURING COMPANY, OF NEW BRITAIN, CONNECTICUT, A CORPORATION OF CONNECTICUT

CHUCK

Application filed February 17, 1926. Serial No. 88,937.

My invention relates more especially to that class of chucks embodying jaws which are movable radially toward and from each other for the purpose of clamping pieces of work between them, and an object of my invention, among others, is the production of a chuck of this class having means for effectively holding such pieces of work against rotation under varied conditions as to the force of the gripping action.

One form of chuck embodying my invention and in the construction and use of which the objects herein set out, as well as others, may be attained, is illustrated in the accompanying drawings, in which—

Figure 1 is a face view of a chuck embodying my invention.

Figure 2 is a view in central section lengthwise through the axis of the chuck.

Figure 3 is a detail view of a portion of a chuck illustrating a modified form of the invention.

Figure 4 is a detail view lengthwise through the chuck jaws on a plane denoted by the dotted line 4—4 of Figure 3.

While my invention is not limited in its use to a chuck of any particular type, yet as it adapts itself particularly to what is commonly known as the "scroll" type of chuck, I have selected such for the purpose of illustration of my invention in the drawings herein, in which drawings the numeral 4 indicates a chuck body of any ordinary form and construction having a back plate 5 secured thereto, and having radially arranged grooves 6 for chuck jaws 7, the back plate being secured to the body as by means of screws 8, and said plate closing an annular chamber 9 containing a scroll ring 10 having a scroll in engagement with scroll teeth 11 on the bottom of the jaws 7. A chuck jaw operating pinion 12, or chuck jaw operating pinions, is or are mounted in the back plate and body with teeth meshing with teeth 13 on the back of the scroll ring 10, said pinion or pinions being provided with means, as an angularly shaped recess in the outer end thereof, to receive a tool by means of which the pinion or pinions may be rotated to open or close the chuck jaws.

All of the parts thus far described are of old and well known construction and no claim is made herein to such except in connection with the parts comprising my invention and to be now described.

My invention comprises auxiliary jaws that are arranged in a manner to effectually aid the main jaws in preventing the rotation of work held between the jaws. This idea may be embodied in different forms, some of such being illustrated herein in which the main jaws 7 each has a cut-away portion 14 forming a shoulder 15 near the back of the jaw, which shoulder is preferably curved on the arc of a circle having a pivot stud 16 as its center. The auxiliary jaws 17 are pivotally attached to the main jaws 7 by means of said studs, these pivots being so arranged that when the jaws are swung on the pivots some part of the front edge of the jaw will be moved nearer to the axis of the chuck and, therefore, a tighter and increased grip will be exerted upon a piece of work held between the jaws. It is immaterial to my invention in which direction the auxiliary jaws shall be swung to effect an increased gripping action, but in one form exemplified herein I have shown the front ends of the jaws recessed so that the increased gripping action will be obtained in a swinging movement of the jaws in either direction. This gripping end of the auxiliary jaws, as well as that of the main jaws, is preferably provided with teeth 18 extending in the direction of depth of the jaws, and the front ends of both the main and auxiliary jaws are substantially flush one with the other.

With this construction it will be observed that I have provided means whereby the hold upon pieces of work may be varied to suit the material of which the work is composed, some material requiring a lesser grip to avoid crushing than other material. The two jaws, the main jaw and the auxiliary jaw, acting together, will permit this to be done and at the same time a grip will be obtained in all cases amply sufficient to prevent rotation of the work within the jaws. The greatest gripping action will be exercised in all cases by the main jaws, and this will be supplemented by the auxiliary jaws so that should the grip of the main jaws be insufficient to prevent rotation of the work an additional grip will be exercised by the auxiliary jaws sufficient to prevent such rotation, as the instant the work begins to turn within the jaws the grip of the auxiliary jaws will be automatically increased. It will, therefore, be seen that the main jaws and the auxiliary jaws act together to secure the contemplated result, and this cannot be obtained with either the main or auxiliary jaws acting alone.

In order to yieldingly retain the auxiliary jaws 17 in their central positions as shown in Figures 1 and 2, I provide a spring pressed detent 19 in each jaw having its beveled or curved end adapted to engage within a shallow recess 20 in the contiguous face of the chuck jaw, the pressure of the detent being such as to release the pivoted jaw and permit it to swing upon the application of some force at the outer end of said auxiliary jaw.

In another form of the invention illustrated in Figures 3 and 4, the pivoted jaws are arranged to receive and hold a piece of work in the form of a ring by pressure against the inner surface thereof. In this form of the device the chuck jaws 21 are mounted on the chuck body 4 in the same manner as hereinbefore described, said jaws each having a raised portion 22 forming a shoulder having a curved recess 23 comprising an arc of a circle struck from the pivot of the swinging jaws 24, the holding ends of these swinging or pivoted jaws being preferably curved and having holding teeth if desired. A spring pressed detent 25, in this case in the form of a ball, is employed to yieldingly retain each jaw in its central position, this detent being located at the mouth of an opening through the raised part 22 of the main jaw. The manner of operation of these swinging jaws will be readily understood from the foregoing description. A spring is located between the ball and a screw plug closing the end of the opening opposite the ball.

A stop 26 in the form of a screw may also be employed to limit the swinging movement of the jaw 24, the inner end of this stop engaging a slot in the back edge of the jaw 24, and as shown in Figure 3 of the drawings.

In this form of the device, as in that form herein first described, the outer end of each of the auxiliary jaws cooperates with a shoulder 27 on the main jaw to hold a piece of work, the outer end of each auxiliary jaw being substantially flush with the shoulder 27 on the main jaw and supplying the increased force required to hold the piece of work from turning.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those set out herein.

I claim:—

1. A chuck jaw structure including a main jaw movable into gripping engagement with a piece of work, an auxiliary jaw movably supported relative to the main jaw so as to be moved into gripping engagement with said work during the similar movement of the main jaw, the relatively movable contacting surfaces of the main and auxiliary jaws being coextensive transversely of the jaws, and the support for said auxiliary jaw permitting the latter to move laterally independently of the main jaw and thereby augment the gripping action upon the work should it effect any turning movement and yielding means for releasably holding the auxiliary jaw fixed with respect to the main jaw until movement of the work relative the main jaw occurs.

2. A chuck jaw structure including a main jaw movable into gripping engagement with a piece of work, an auxiliary jaw having a single work gripping face movably supported by the main jaw so as to be moved into gripping engagement with said work during the similar movement of the main jaw, the support for said auxiliary jaw permitting the latter to move laterally independently of the main jaw and thereby increase its gripping action on said work should the latter effect any turning movement, and yielding means for releasably holding the auxiliary jaw fixed with respect to the main jaw until movement of the work relative the main jaw occurs.

3. A chuck jaw structure including a main jaw movable into gripping engagement with a piece of work, an auxiliary jaw pivotally supported by the main jaw so as to be moved into gripping engagement with said work during the similar movement of the main jaw, a free pivotal connection between the main jaw and the auxiliary jaw for permitting the latter to move laterally independently of the main jaw and thereby increase its gripping action on said work should the latter effect any turning movement and yielding means for releasably holding the auxiliary jaw fixed with respect to the main jaw until movement of the work relative the main jaw occurs.

4. A chuck jaw structure including a main jaw, an auxiliary jaw having a single work gripping face, means for moving both of said jaws simultaneously into gripping engagement with a piece of work, a free pivotal mounting for said auxiliary jaw which permits the latter to move in opposite directions relative to the main jaw to increase the gripping action on said work should it effect any turning movement, and yielding means for releasably holding the auxiliary jaw fixed with respect to the main jaw until movement of the work relative to the main jaw occurs.

5. A chuck comprising a body, a chuck jaw structure supported by said body and movable into gripping engagement with a piece of work, said chuck jaw structure including a main jaw, an auxiliary jaw, a free pivotal mounting for movably supporting the auxiliary jaw relative to the main jaw so as to permit the auxiliary jaw to move laterally independently of the main jaw and thereby increase the gripping action on the work should it effect any turning movement, and yielding means for releasably holding the auxiliary jaw fixed with respect to the main jaw until movement of the work relative the main jaw occurs.

6. A chuck comprising a body, a chuck jaw structure movable into gripping engagement with a piece of work, said chuck jaw structure including a main jaw, an auxiliary jaw, a free pivotal mounting for supporting the auxiliary jaw on the main jaw so as to permit the latter to move laterally independently of the main jaw and thereby increase the gripping action on the piece of work should the latter effect any turning movement, and yielding means for releasably holding the auxiliary jaw fixed with respect to the main jaw until movement of the work relative the main jaw occurs.

7. A chuck jaw structure including a main jaw having a work gripping surface extending the full width of the jaw and formed on the arc of a circle, an auxiliary jaw connected to the main jaw and having a work gripping surface extending the full width of the jaw and formed on an arc of the aforementioned circle, means for moving said jaws into gripping engagement with a piece of work, the relatively movable contacting surfaces of the main and auxiliary jaws being coextensive transversely of the jaws, and the connection for the auxiliary jaw permitting said jaw to move relative to the main jaw to increase the gripping action upon the work should the latter effect any turning movement, and yielding means for releasably holding the auxiliary jaw fixed with respect to the main jaw until movement of the work relative the main jaw occurs.

8. A chuck jaw structure including a main jaw, an auxiliary jaw, means for adjusting both of said jaws into gripping engagement with a piece of work, a free pivotal mounting for supporting the auxiliary jaw in its adjusted position so that slippage of the work with respect to the main jaw will cause the auxiliary jaw to move laterally independently of the main jaw and thereby grip the work with greater force, and yielding means for releasably holding the auxiliary jaw fixed with respect to the main jaw until movement of the work relative the main jaw occurs.

9. A chuck structure comprising a chuck body, work gripping means carried by said body, means for moving said work gripping means into engagement with a piece of work with enough force so as to hold the latter against rotation until the torsional strain exerted upon the latter reaches a predetermined point, additional work gripping means, means for connecting the additional work gripping means to said first mentioned gripping means so as to be moved into engagement with said work during the similar movement of the first mentioned gripping means, said connecting means comprising a free pivotal mounting for permitting the additional gripping means to be moved by slippage of the work with respect to the first mentioned gripping means independently of the latter and after said torsional strain has passed said predetermined point to arrest said slippage, and yielding means for releasably holding the additional work gripping means fixed with respect to the first mentioned work gripping means until movement of the work occurs.

10. A chuck jaw structure including a main jaw movable into gripping engagement with a piece of work, said main jaw being cut away to provide a gripping surface of less depth than the depth of the jaw, an auxiliary jaw movably mounted within the cut away portion of the main jaw so as to be moved into gripping engagement with said work during the similar movement of the main jaw, a free pivotal connection between the auxiliary jaw and the main jaw for causing the auxiliary jaw to move laterally independently of the main jaw and thereby augment the gripping action upon the work should the latter effect any turning movement, and yielding means for releasably holding the auxiliary jaw fixed with respect to the main jaw until movement of the work relative the main jaw occurs.

GEORGE G. BUSH.